United States Patent [19]

Valdois et al.

[11] 4,199,990
[45] Apr. 29, 1980

[54] ELASTIC SURFACE WAVE ACCELEROMETER

[75] Inventors: Michel Valdois; Patrick Levesque; Pierre Hartemann, all of Paris, France

[73] Assignee: Thomson-CSF, Paris, France

[21] Appl. No.: 919,550

[22] Filed: Jun. 27, 1978

[30] Foreign Application Priority Data

Jul. 1, 1977 [FR] France .................. 77 20372

[51] Int. Cl.² .................................. G01P 15/08
[52] U.S. Cl. .................................. 73/517 AV
[58] Field of Search .......... 73/517 R, 517 B, 517 AV, 73/517, 574, 579, DIG. 4, 141 A, 654; 310/313

[56] References Cited

U.S. PATENT DOCUMENTS

| | | |
|---|---|---|
| 3,517,560 | 6/1970 | Jacobs et al. .................. 73/517 R X |
| 3,863,497 | 2/1975 | Vaart ............................ 73/517 R X |
| 3,961,293 | 6/1976 | Hartmann ....................... 310/313 X |
| 3,999,147 | 12/1976 | Otto et al. ..................... 310/313 X |
| 4,096,740 | 6/1978 | Sallee .......................... 73/579 X |

Primary Examiner—Jerry W. Myracle
Attorney, Agent, or Firm—Cushman, Darby & Cushman

[57] ABSTRACT

The invention relates to accelerometers comprising a vibrating elastic body associated with an electrical oscillator for maintaining its oscillations and a frequency measuring device for measuring its frequency. More particularly, the invention relates to an accelerometer in which the vibrations are in the form of elastic surface waves propagated along one face of a wafer of piezoelectric material cemented to a substrate. Measurement of the acceleration is based on the measurement of a frequency deviation or phase shift undergone by the elastic surface waves.

10 Claims, 2 Drawing Figures

ELASTIC SURFACE WAVE ACCELEROMETER

This invention relates to systems for measuring acceleration and, more particularly, to systems using the propagation of elastic surface waves.

For measuring an acceleration, it is possible to detect the elastic deformations undergone by an elastic body attached to a base. It is also possible to provide for the mechanical tension of a vibrating string to be modified by the acceleration to be measured so that the variation in the oscillation frequency of this string may serve as a measure of the acceleration. By combining the technique of measuring an oscillation frequency with the principle which consists in detecting the acceleration by the elastic deformation of a test body, it is possible to obtain an accelerometer of the type comprising a bulk-wave resonator cut into a plate of piezoelectric material. An electrical circuit is associated with this resonator to enable the oscillations to be maintained. An accelerometer such as this has a structure very similar to that of a conventional crystal-driven oscillator. The sensitivity to acceleration is relatively low.

In order to reduce this disadvantage, the invention provides for the acceleration to be measured to act on an elastic body of which one major face propagates elastic surface waves. Since the elastic body is fixed to the base by its other major face, the phenomenon of vibration remains confined to a thin zone of heavy deformation located near the free surface. This results in a high sensitivity of measurement of the acceleration and in the precise delimitation of the propagation characteristics brought into play.

In accordance with the present invention, there is provided an elastic surface wave accelerometer comprising a base undergoing the acceleration to be measured, a wafer of elastic piezoelectric material, oscillator means for causing elastic surface waves to propagate at the surface of said wafer and detector means for detecting the angular modulation of the a.c oscillation voltage produced by said oscillator means; the first major face of said wafer carrying at least one electromechanical transducer connected to said oscillator means; the second major face of said wafer being cemented to said base along its whole area.

For a better understanding of the present invention and to show how the same may be carried into effect, reference will be made to the following description in conjunction with the accompanying drawings, wherein.

Figure 1:
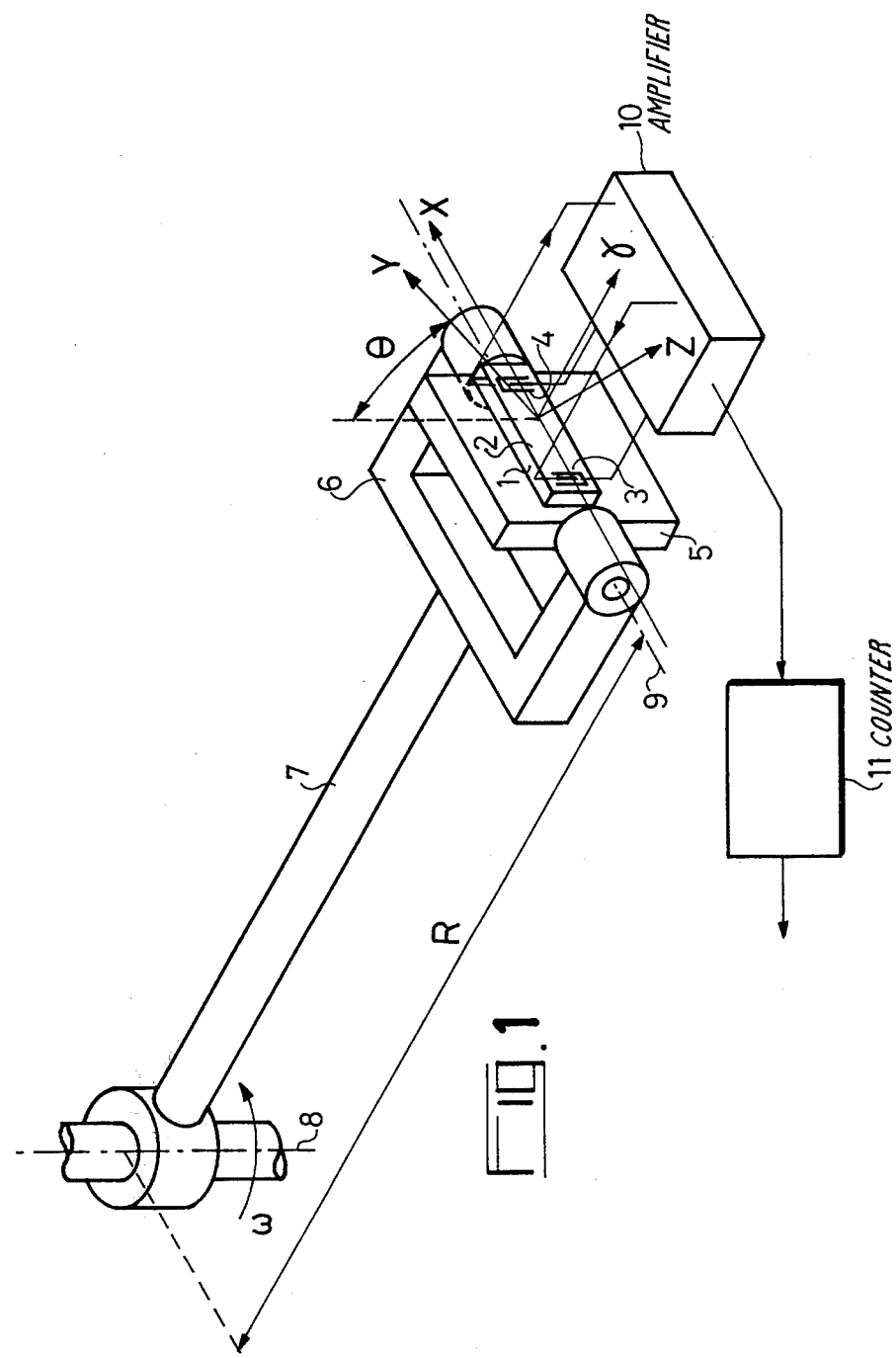
FIG. 1 shows an elastic surface wave accelerometer attached to the arm of a centrifuge.

FIG. 1 shows the rotary arm 7 of a centrifugal machine intended to generate and acceleration taking into account the acceleration of gravity $\vec{g}$. The terminal fork 6 is provided with bearings in which a base 5 pivots about the axis 9. When the arm 7 is rotated about the axis 8 at the angular velocity $\omega$, there is generated an acceleration $\gamma = \vec{g} + \vec{R}\omega^2$ where $(\vec{R})$ is the radius of gyration relative to the bearing surface of the base 5. A piezoelectric wafer 1 rests on the base 5 by one of its major faces. It is fixed to the base 5 by bonding. The other major face 2 of the wafer 1 carries two electromechanical transducers 3 and 4 which exchange elastic surface waves in the direction X parallel to the pivoting axis 9.

By way of non-limiting example, the wafer 1 is a ST cut of quartz.

The transducers 3 and 4 are formed by conductive electrodes in the form of interdigital combs which are deposited on the major face 2. The emissive intervals delimited by the teeth of the combs are rectilinear and oriented perpendicularly to the axis X. The axes Y and Z form with the axis X the system of reference axes of the quartz. The angle $\theta$ which the face 2 forms with the axis Y is characteristic of the ST cut.

The input terminals of an electrical amplifier system 10 are connected to the transducer 4 which is intended to receive the elastic surface waves. The output of the system 10 feeds the transducer 3 so as to emit these waves towards the transducer 4. By virtue of the frequency-selective electromechanical feed back effected by the elastic surface wave structure, the amplifier system 10 enters into oscillation at a frequency f which depends upon the acceleration $\vec{\gamma}$.

The oscillation signal emanating from the oscillator assembly 10, 1, 2, 3, 4 is applied to a device 11 which delivers a signal representative of the frequency deviation caused by the acceleration $\vec{\gamma}$.

By way of non-limiting example, the device 11 may be formed by a counter operating either as a frequency meter or as a period meter.

The accelerometer shown in FIG. 1 is an ST. cut delay-line oscillator. By selecting an oscillation frequency of approximately 105 MHz, a frequency deviation reaching 12 Hz per g was obtained, g being equal to 9.81 m/s$^2$. Accordingly, the maximal relative sensitivity amounts to approximately $10^{-7}$/g.

The sensitivity is a sinusoidal function of the angle defining the direction of the acceleration in a given plane. Accordingly, there are directions of maximal sensitivity and zero sensitivity orthogonal to one another.

The orientation of the accelerometer which leads to a maximal sensitivity is such for example that the direction of the acceleration $\vec{\gamma}$ is situated in the plane YZ. By pivoting the base 5 about the axis 9, there is observed a frequency deviation which has a first maximum when the acceleration $\vec{\gamma}$ forms an angle of the order of $+42°$ with the axis Y. The rotation of the base 5 through 180° gives a second maximum which is equal to the first but opposite in sign.

Although the sensitivity of measurement is considerably greater than that obtained with conventional piezoelectric accelerometers, the frequency deviation remains low in absolute value. Accordingly, the frequency drift of thermal origin has to be made as low as possible by selecting a suitable cut. In particular, to reduce the measurement error attributable to a variation in temperature, it is useful to accommodate the elastic surface wave accelerometer in a thermostatically controlled enclosure. The ion implantation of a portion of the surface propagating the elastic waves makes it possible to accentuate the temperature range in which the temperature variation is smallest. This technique of stabilising frequency as a function of temperature is particularly effective when the plate is cut along the Y or ST cut.

The frequency deviation as a function of the acceleration may be attributed to the fact that the surface propagating the elastic waves undergoes a deformation. In the case of FIG. 1, the acceleration $\vec{\gamma}$ creates in the plate 1 mechanical tensions which increase in the direction of the face bonded to the base 5. The effect of this state of tension is to curve the free face 2 of the plate 1, causing the transit time of the elastic surface waves to be lengthened or shortened. In order to retain the phase condition in which self-oscillation is obtained, the oscillation frequency changes value.

In the preceding example, reference has been made to a deformable elastic surface wave structure which forms a filter of the quadripole type.

Figure 2:
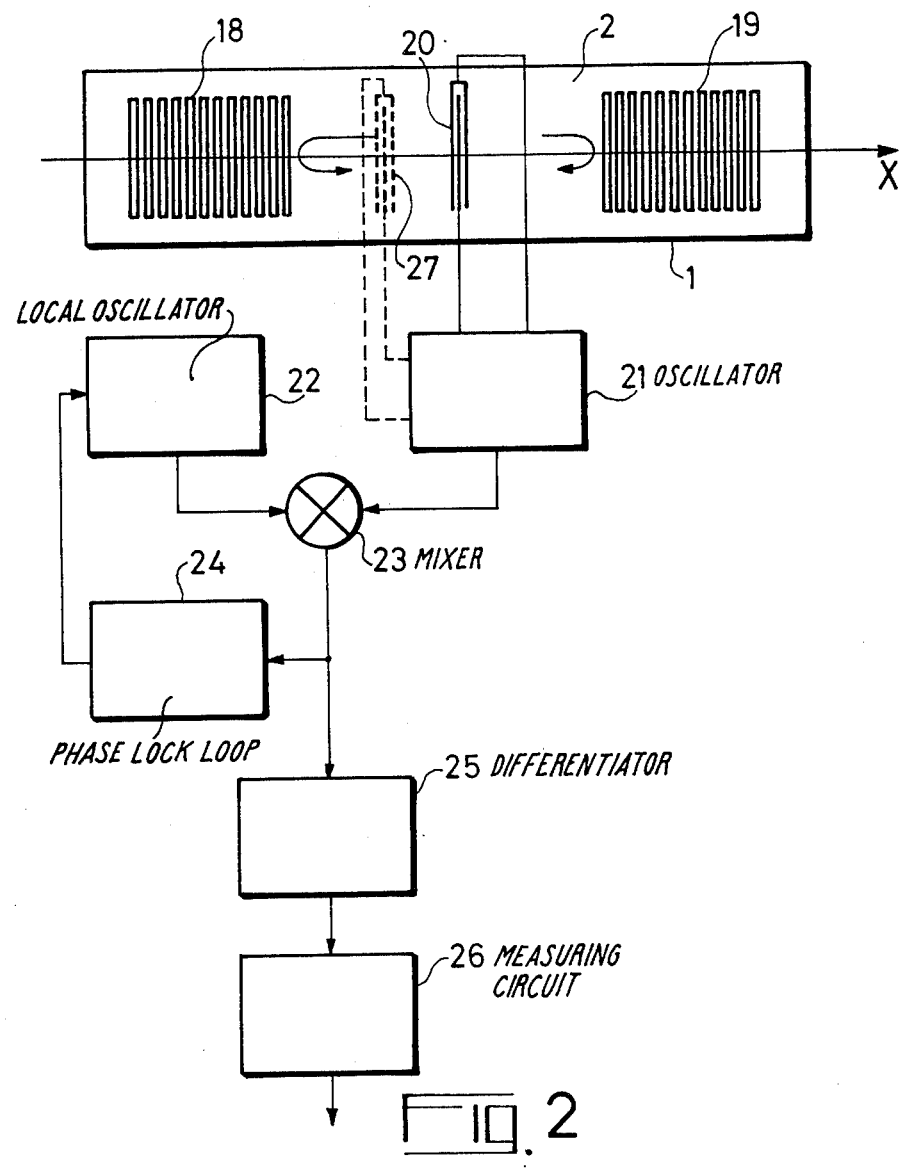
FIG. 2 shows a variant of the accelerometer illustrated in FIG. 1.

FIG. 2 shows another variant in which the elastic surface wave structure is a resonator.

The wafer 1 subjected to the acceleration to be measured exchanges elastic surface waves through its upper major face 2. A standing wave state is created by providing the face 2 with two reflector gratings 18 and 19. The lines of the gratings 18 and 19 may be obtained by scoring the wafer 1, by local deposits made on the surface 2 or by ion bombardment of the surface 2. There is thus created a mirror-type resonant cavity inside which an electromechanical conversion may be effected through a transducer 20. By connecting the transducer 20 to an oscillator circuit 21 having a negative electrical resistance of adequate value, there is obtained a self-oscillating arrangement of which the oscillation frequency is determined by the resonant cavity. Under the effect of the acceleration applied to the wafer 1, a deviation in the oscillation frequency is observed.

FIG. 2 shows one method of detecting the frequency deviation caused by the acceleration by which it is possible to indicate the rapid fluctuations in the acceleration to be measured. To this end, the a.c voltage issuing from the oscillator circuit 21 is applied to a balanced mixer 23 which, at its other input, receives an a.c. voltage produced by a local tunable oscillator 22. The mixer 23 delivers a voltage representative of the phase shift between the a.c voltages which are applied to it. A slow-acting phase-locking loop 24 connects the output of the mixer 23 to the frequency control input of the local oscillator 22. By way of non-limiting example, the oscillator 22 is a frequency synthesiser and the locking loop comprises a low-pass filter which transmits the slow fluctuations in the voltage issuing from the mixer 23. The local oscillator 22 supplies an a.c voltage of which the frequency follows the frequency of the a.c voltage produced by the oscillator circuit 21. The slow fluctuations in the acceleration to be measured are compensated by the phase locking loop which has a phase constant of, for example, a few seconds. On the other hand, the fluctuations in phase arising out of the rapid fluctuations in the acceleration are available at the output of the mixer 23. A differentiating circuit 25 converts the phase fluctuations into an electrical voltage representative of the momentary frequency drift. This electrical voltage is applied to a measuring circuit 26. By way of non-limiting example, the circuit 26 may comprise a voltage-frequency converter followed by a frequency meter counter operating as a period meter. The means for measuring the frequency drift which are illustrated in FIG. 2 are advantageous when it is desired to measure the fluctuations in the acceleration because the measurement is not falsified by the temperature variation. In addition, since the measurement is dependent upon the derivative of a phase deviation, the response is very rapid.

An additional transducer 27 situated inside the resonant cavity is shown in dotted lines in FIG. 2. This transducer 27 co-operates with the transducer 20 to ensure a maximul exchange of vibratory energy at the resonance frequency of the cavity. In this case, the circuit 21 is an amplifier circuit of which one output is connected to the transducer 27 and its input to the transducer 20.

What we claim is:

1. An elastic surface wave accelerometer comprising a base undergoing the acceleration to be measured, a wafer of elastic piezoelectric material, oscillator means for causing elastic surface waves to propagate at the surface of said wafer and detector means for detecting the angular modulation of the a.c. oscillation voltage produced by said oscillator means; the first major face of said wafer carrying at least one electromechanical transducer connected to said oscillator means; the second major face of said wafer being cemented to said base along its whole area.

2. An accelerometer as claimed in claim 1, wherein said first major face carries electromechanical transmitting and receiving transducers exchanging said elastic surface waves in a predetermined direction.

3. An accelerometer as claimed in claim 2, wherein said oscillator means comprise an electrical amplifier circuit connected to said electromechanical transducers so as to form a self-oscillation system.

4. An accelerometer as claimed in claim 1, wherein said oscillator means comprise at least one electromechanical transducer formed by electrodes in the form of interdigital combs.

5. An accelerometer as claimed in claim 1, wherein said material is quartz; said wafer being formed by a cut of one of the following types: ST, Y and AT.

6. An accelerometer as claimed in claim 1, wherein said detection means detect a frequency deviation induced by said acceleration.

7. An accelerometer as claimed in claim 1, wherein said detection means detect a phase variation induced by said acceleration.

8. An elastic surface wave accelerometer comprising a base undergoing the acceleration to be measured, a wafer of elastic piezoelectric material, oscillator means for causing elastic surface waves to propagate at the surface of said wafer and detector means for detecting the angular modulation of the a.c. oscillation voltage produced by said oscillator means; the first major face of said wafer carrying at least one electromechanical transducer connected to said oscillator means; the second major face of said wafer being cemented to said base along its whole area; said first major face carrying two gratings reflecting said elastic surface waves and arranged to form a resonant cavity; at least one electromechanical transducer being carried by said first major face inside said resonant cavity; said oscillator means comprising a negative-resistance electrical circuit connected to said electromechanical transducer to form a self-oscillation system.

9. An elastic surface wave accelerometer comprising a base undergoing the acceleration to be measured, a wafer of elastic piezoelectric material, oscillator means for causing elastic surface waves to propagate at the surface of said wafer and detector means for detecting the angular modulation of the a.c. oscillation voltage produced by said oscillator means; the first major face of said wafer carrying at least one electromechanical transducer connected to said oscillator means; the second major face of said wafer being cemented to said base along its whole area; said first major face carrying to gratings reflecting said elastic surface waves and arranged to form a resonant cavity; two electromechanical transducers being arranged inside said resonant cavity along its axis; said oscillator means comprising an electrical amplifier circuit connecting said transducers to form a self-oscillation system.

10. An elastic surface wave accelerometer comprising a base undergoing the acceleration to be measured, a wafer of elastic piezoelectric material, oscillator means for causing elastic surface waves to propagate at the surface of said wafer and detector means for detecting the angular modulation of the a.c. oscillation voltage produced by said oscillator means; the first major face of said wafer carrying at least one electromechanical transducer connected to said oscillator means; the second major face of said wafer being cemented to said base along its whole area; said detection means detecting a phase variation induced by said acceleration; said detection means comprising a differentiating circuit converting said phase variation into a frequency deviation; said phase variation being supplied by a mixing circuit respectively receiving said a.c. oscillation voltage and a voltage supplied by a local tunable oscillator; the output of said mixer being connected to the tuning input of said tunable oscillator by a negative feedback loop.

* * * * *